(12) United States Patent
Cinquemani

(10) Patent No.: US 6,959,793 B2
(45) Date of Patent: Nov. 1, 2005

(54) INERTIAL BRAKE ACTUATOR FOR TOWED VEHICLE

(76) Inventor: Paul Cinquemani, 348 Robin La., Elyria, OH (US) 44035

( * ) Notice: Subject to any disclaimer, the term of this patent is extended or adjusted under 35 U.S.C. 154(b) by 0 days.

(21) Appl. No.: 10/651,012

(22) Filed: Aug. 28, 2003

(65) Prior Publication Data

US 2004/0251094 A1    Dec. 16, 2004

Related U.S. Application Data

(60) Provisional application No. 60/407,500, filed on Aug. 31, 2002.

(51) Int. Cl.[7] .............................. B60T 7/20; B60T 13/06
(52) U.S. Cl. ....................... 188/112 R; 188/135; 303/7; 303/24.1
(58) Field of Search ........................... 188/110, 112 R, 188/135, 140 R, 141, 140 A; 303/7, 24.1

(56) References Cited

U.S. PATENT DOCUMENTS

| | | | | | |
|---|---|---|---|---|---|
| 2,807,337 | A | * | 9/1957 | Bengt | 188/349 |
| 2,870,876 | A | * | 1/1959 | Pease | 188/140 R |
| 3,990,749 | A | * | 11/1976 | Mizen et al. | 188/112 R |
| 5,195,768 | A | * | 3/1993 | Hendrix | 188/112 R |
| 6,644,761 | B2 | * | 11/2003 | Schuck | 303/24.1 |

* cited by examiner

*Primary Examiner*—Thomas Williams
(74) *Attorney, Agent, or Firm*—Charles R. Szmanda

(57) ABSTRACT

Disclosed herein is a brake actuator for a towed vehicle having a brake actuated by a pedal. The actuator comprises a weight, slidably mounted to a base, a base and a slidable mount. Alternatively, the actuator comprises a weight, slidably mounted to a base, a base, a slidable mount and an auxiliary vacuum system for use with power-assisted brakes.

20 Claims, 2 Drawing Sheets

INERTIAL BRAKE ACTUATOR FOR TOWED VEHICLE

REFERENCE TO PRIOR APPLICATION

This application claims the benefit of the previously filed provisional application No. 60/407,500 filed Aug. 31, 2002.

FIELD OF THE INVENTION

The present invention relates to braking systems for towed vehicles. In particular, this invention relates to a device for actuating the brakes of a vehicle being towed in such a manner as to be responsive to the deceleration of the towing vehicle.

BACKGROUND OF THE INVENTION

Ordinarily, the combination of a first vehicle such as a motor home and a second vehicle such as an automobile or a light truck, where the first vehicle is towing the second vehicle, is stable on the road. However, there are circumstances when the combination can become unstable because of driving conditions normally encountered at highway speeds. For example, when the combination is overtaken by a large vehicle, it may be subject to wind turbulence effects of varying severity, depending on the size and speed of the overtaking vehicle. This can cause rocking, snaking or jackknifing of the combination. Such instabilities are known to cause accidents, particularly at highway speeds.

As another example, instabilities can arise as a result of the towing vehicle having to brake suddenly. In the case of sudden braking, the brakes of the towing vehicle are usually not designed to stop with the additional weight carried by the towed vehicle, resulting in a longer stopping distance than would otherwise obtain at normal towing vehicle weight. Moreover, the towed vehicle may decelerate more slowly than the towing vehicle, resulting in snaking, jackknifing or other instabilities.

As still another example, instabilities can arise as the result of the towing vehicle swerving to avoid road obstacles such as animals or tire debris. Ordinarily, if given sufficient time, the driver can avoid the obstacle by steering smoothly around it. However, if the obstacle is encountered suddenly, such as in circumstances where an animal darts out in front of the towing vehicle or the animate or inanimate obstacle is encountered on a curve or on a hill, the driver may attempt to avoid the obstacle by swerving suddenly and the combination may become unstable because the forward momentum of the towed vehicle may briefly cause the rear of the towing vehicle to skid in a sideways direction relative to the forward direction of the towing vehicle. Such instabilities manifest themselves as jackknifing or snaking and in severe cases, may result in the combination rolling over.

One method of returning an unstable combination to stability in situ is to accelerate the towing vehicle, causing a pull between the towing vehicle and the towed vehicle, which acts to dampen the instability. However, under certain circumstances, for example, if the combination is traveling down hill or if the speed of the combination is high at the onset of the instability or if jackknifing has caused the towing vehicle to swerve away from its intended direction, acceleration of the towing vehicle will not produce the required pull between the towing vehicle and the towed vehicle. Under such circumstances, acceleration of the towing vehicle can merely aggravate the situation.

In order to enable the combination of vehicles to slow safely or to decelerate the forward motion of the towed vehicle in a coordinated fashion with that of the towing vehicle, such as when the combination must swerve to avoid a road obstacle, several methods of applying the brakes of the towed vehicle have been developed. For example, in U.S. Pat. No. 2,177,469, White discloses an auxiliary hydraulic actuator for applying the brake pedal of the towed vehicle when the brakes of the towing vehicle are applied. The system does not require modification of the existing brake system of the towed vehicle. However, the vacuum required to operate the hydraulic pedal pusher is supplied by the vacuum system of the towing vehicle through a hose connecting the two vehicles. This approach requires costly connecting hoses and fittings. Moreover, an encounter with road debris could result in breakage or disconnection of the vacuum hose, resulting in a loss of vacuum in the engine of the towing vehicle and a shutdown of the power assist portion of the braking system without warning.

Another means of solving this problem was disclosed by Latham in U.S. Pat. No. 5,954,164. This patent teaches an inertial actuator for a towed vehicle braking system in which a weight, mounted on a pendulum, actuates the brake pedal of the towed vehicle. To augment the power assist function of the towed vehicle, an auxiliary vacuum system is provided. The installation of the inertial actuator module requires considerable time and effort. For example, the module is bolted to the floor of the towed vehicle, which may require drilling through the floor. In addition, a special fixture is required on the arm supporting the brake pedal for engagement with the pedal engaging surface. Installation of this fixture also requires holes to be drilled in the pedal arm. Considerable time must be spent dismounting the actuator module once the combination arrives at its destination.

SUMMARY OF THE INVENTION

It should be understood that the term "means" is used to invoke "means plus function" language.

The present invention, according to its first broad aspect provides an inertial brake actuator for a towed vehicle having a floor and a braking system actuated by a brake pedal comprising: (a) a base, comprising a top side and a bottom side; (b) a weight comprising a means for contacting the brake pedal, a top and a bottom, slidably mounted to the base along a line of travel between a forward position and a rearward position, wherein the means for contacting the brake pedal are configured to actuate the brake pedal responsive to the deceleration of the towed vehicle and wherein the weight has sufficient mass to apply a braking force to the brake pedal during deceleration of the towed vehicle; (c) sliding means between the base and the weight wherein the sliding means enforce said line of travel between said forward position and said rearward position.

Various modifications can be made to the first broad aspect of this invention. For example, one can employ a means of attaching the brake pedal to the weight. As another example, the sliding means can be configured between the top of the base and the bottom of the weight. As still another example, the weight can comprise a plurality of separable weight segments so as to adjust the mass of the weight to apply a proper braking force. It should be noted that the individual weight segments need not be identical. As still another example, the base can further comprise means for constraining the motion of the base relative to the motion of the towed vehicle so that the brake actuator does not move out of position in response to tilt, centripetal acceleration or jarring of the towed vehicle. As still another example, there is provided a means for moderating the motion of the weight along its line of travel. As another example, there is provided a weight portion of the brake actuator that has sufficient mass to slow the towed vehicle by at least 10 percent. As yet another example, there is provided a weight portion of the brake actuator that has sufficient mass to slow the towed vehicle by at least 50 percent.

According to its second broad aspect, this invention provides an inertial brake actuator for a towed vehicle having a floor and a vacuum-based power assisted braking system actuated by a brake pedal comprising (a) a base comprising a top side and a bottom side; (b) a weight comprising a means for contacting the brake pedal, a top and a bottom, slidably mounted to the base along a line of travel between a forward position and a rearward position, wherein the means for contacting the brake pedal are configured to actuate the brake pedal responsive to the deceleration of the towed vehicle and wherein the weight has sufficient mass to apply a braking force to the brake pedal during deceleration of the towed vehicle; (c) sliding means between the base and the weight wherein the sliding means enforce said line of travel between said forward position and said rearward position; (d) an auxiliary vacuum source connectable to the towed vehicle braking system to augment the actuation of the towed vehicle braking system.

The various modifications to the brake actuator module are the same as those provided for in the first broad aspect supra and are incorporated herein by reference. A further modification of the second broad aspect of this invention is that the auxiliary vacuum source comprises a vacuum pump. Yet another modification to the second broad aspect of this invention is that the vacuum pump is operated electrically. A further modification of the second broad aspect of this invention is that the vacuum pump operation is controlled by a normally-on vacuum switch.

One advantage of the present invention is that there is no connection between the towing vehicle and the braking system of the towed vehicle.

Another advantage of the present invention is that very little time is required to move the brake actuator module from its operating position to its stored position so as to render the towed vehicle ready to drive.

Still another advantage of the present invention is that the brake pedal actuator module is installed in such a way that the inertial force applied to the brake pedal of the towed vehicle is applied in nearly collinear fashion with the motion of the brake pedal. This means that setup of the actuator system and the means of moderating the motion of the weight can be done very simply. For example, when driving an automobile equipped with power brakes on a dry, level concrete surface, the tires will lose traction and begin to skid at about 0.7 G. This occurs with a force applied to the brake pedal of about 35 lb. On wet pavement skidding will occur at a deceleration of 0.6 G or less when the force applied to the brake pedal is approximately 30 lb. The selection of the mass of the weight and the strength of the spring used to prevent the weight from being applied when there is no deceleration can thus be done very simply.

DESCRIPTION OF THE DRAWINGS

These and other advantages of the present invention will be more fully and completely understood in accordance with the following description.

DETAILED DESCRIPTION OF THE DRAWINGS

Figure 1:
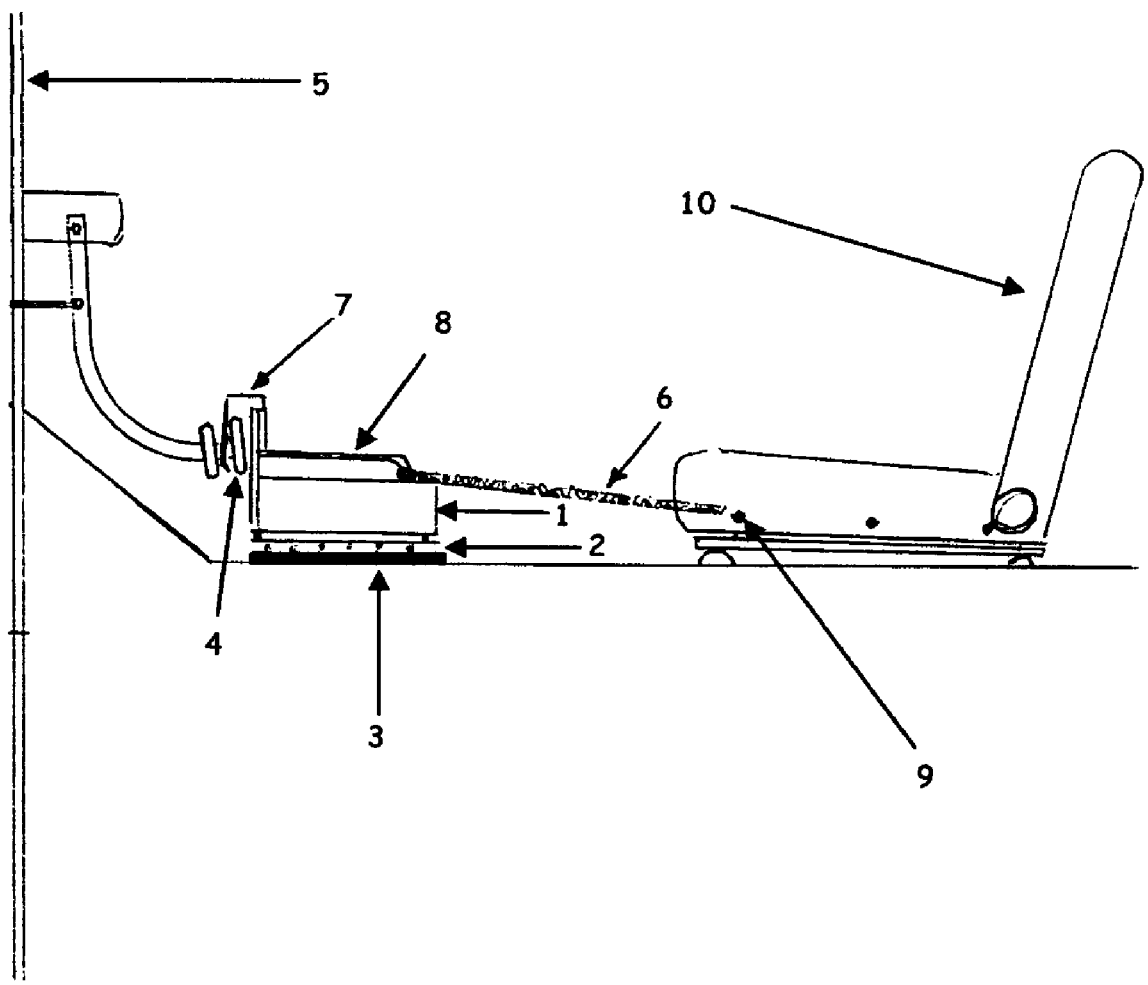
FIG. 1 is a side view of the driver's compartment of the towed vehicle when the brake actuator module is in operation.

Shown in FIG. 1 is the driver's compartment of the towed vehicle. The weight at 1 is attached to a slidable ball bearing mount at 2 which, in turn, is attached to a base at 3. The module is aligned with the brake pedal at 4, which is mounted to the fire wall at 5. A spring or bungee cord 6 is used to hold the weight back from the brake pedal so that it will only slide forward during a forward deceleration of sufficient magnitude. In this embodiment, the spring or bungee cord is attached to the weight at its handle 8 and to an existing support bracket 9 underneath the car seat 10. In order to prevent sideways motion, the weight 1 is loosely attached to the brake pedal by a pair of hooks 7 which are mounted to the top of the weight by hinges. As can be seen, the module can be removed for driving after releasing the spring or bungee cord 6 and rocking the hooks 7 back away from the brake pedal so that they rest on the weight.

Figure 2:
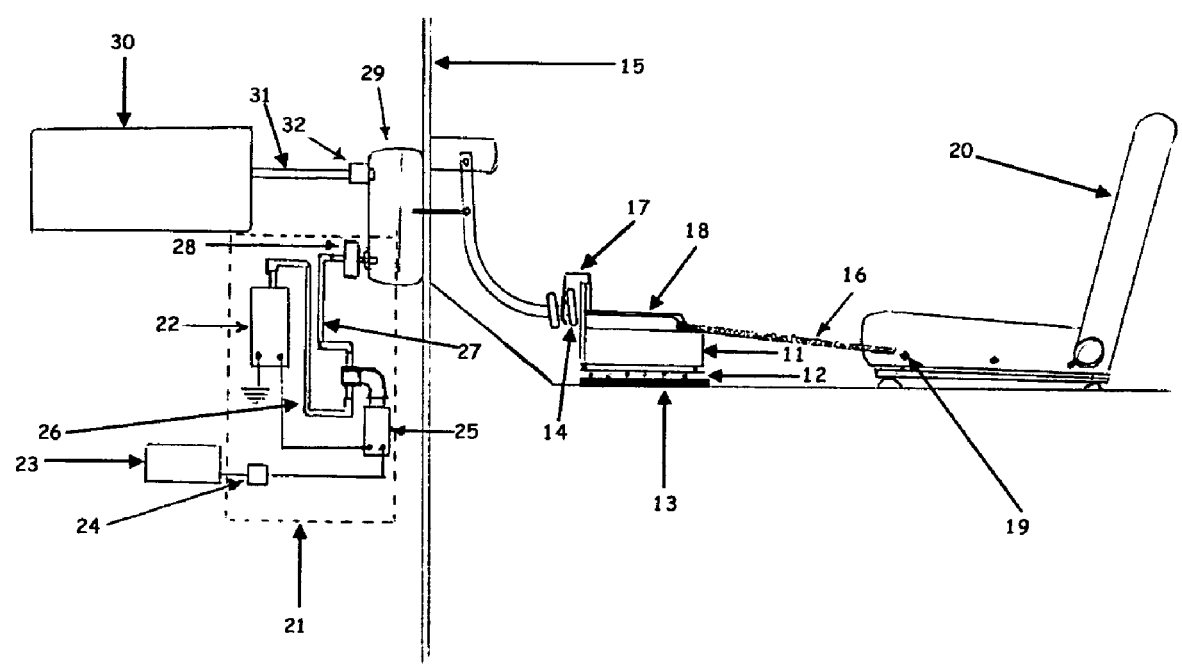
FIG. 2 is a side view of the driver's compartment of the towed vehicle when the brake actuator module is in operation. In addition, there is provided a separate module for vehicles with power-assisted brakes. This module is shown diagrammatically by the dashed rectangle on the opposite side of the towed vehicle's firewall.

Shown in FIG. 2 is the driver's compartment of the towed vehicle and a diagram of the engine compartment on the other side of the firewall. The weight at 11 is attached to a slidable ball bearing mount at 12 which, in turn, is attached to a base at 13. The module is aligned with the brake pedal at 14 which is mounted to the fire wall at 15. A spring or bungee cord 16 is used to hold the weight back from the brake pedal so that it will only slide forward during a forward deceleration of sufficient magnitude. In this embodiment, the spring or bungee cord is attached to the weight at its handle 18 and to an existing support bracket 19 underneath the car seat 20. In order to prevent sideways motion, the weight 11 is loosely attached to the brake pedal by a pair of hooks 17 which are mounted to the top of the weight by hinges. As can be seen, the module can be removed easily for driving after releasing the spring or bungee cord 16 and rocking the hooks 17 back away from the brake pedal so that they rest on the weight.

Also in FIG. 2 is an auxiliary source of vacuum, shown in the dashed box at 21 on the opposite side of the firewall 15. The electrical vacuum pump 22 is powered by a connection to the towed vehicle fuse box at 23. A manual on-off switch 24 is used to limit the operation of the vacuum pump to those times when the vehicle is being towed. The operation of the vacuum pump is further limited by a vacuum actuated switch at 25, electrically connected in series with the manual on-off switch 24. A vacuum hose 26 runs from the vacuum pump at 22 to the vacuum switch at 25. A second vacuum hose at 27 runs to a check valve 28, which, in turn, is connected to the brake booster at 29. In normal operation, the vacuum is provided by the engine, which is connected via a vacuum hose 31 to a check valve 32, which, in turn, is connected to the brake booster at 29. Once the required vacuum is achieved during towing, the normally-on vacuum operated switch 25 disconnects the vacuum pump. In this way, the vacuum pump is only in operation when vacuum is required.

Means for contacting the brake pedal can be an integral part of the weight such as the corner or front end of a generally box-shaped weight. In addition, means for contacting the brake pedal can be a combination of a contact fixture for contacting the brake pedal and an attachment fixture for attaching the contact fixture to the weight. The attachment fixture can be a straight, bent or shaped bar, a plate, or a bracket held in place by a weld, a screw, a rivet, a magnet, a combination or plurality of any of the forgoing or any other rigid fastener or combination of rigid fasteners known in the art. In addition, the attachment fixture can be a hinge or other fixture having at least one pivot axis with one side of the hinge attached to the weight and the other side of the hinge attached to the contact fixture in such a way as to permit a rocking motion around the pivot axis. Furthermore, the attachment fixture can include a plurality of hinges configured to permit a rocking motion about several pivot axes. The contact fixture can include a flat surface configured so that at least one geometrical tangent of the flat surface is substantially parallel to the face plate of the brake pedal during operation, a ribbed surface wherein the ribs are cut in a horizontal or vertical direction relative to the face plate of the brake pedal, a curved surface configured to permit a rocking motion when in contact with the brake pedal during operation or a roller configured to roll up and down the face plate of the brake pedal during operation. The curved surface and the roller can be essentially circular or have elliptical or nautilus type curvature.

Sliding means between the base and the weight are configured to enforce a line of travel between the base and the weight and may include a stop to constrain the motion of the weight between a forward position and a rearward position and can include singularly or in combination, a lubricated, generally concentric curved interface between the base and the weight, a lubricated tongue in groove assembly, a lubricated dove-tail assembly, a generally t-shaped slider in a slotted guide or the like. In addition, sliding means between the base and the weight can include a ball bearing guide assembly such as might be used as a drawer slide; examples of which are described by Hoffman in U.S. Pat. No. 5,507,571, incorporated herein by reference, by Bayani in U.S. Pat. No. 6,145,944, incorporated herein by reference, by Yang in U.S. Pat. No. 6,386,660, incorporated herein by reference or the like. Further, sliding means between the base and the weight can include a wheel-type guide such as might be used in a drawer slide; examples of which are described by Fall in U.S. Pat. No. 4,200,342, incorporated herein by reference, by Houck in U.S. Pat. No. 5,580,174, incorporated herein by reference, by Grieser in U.S. Pat. No. 5,785,400, incorporated herein by reference or the like. Other sliding means between the base and the weight comprise an air bearing or magnetic levitation. The sliding means between the base and the weight can comprise a single slide assembly, a plurality of slide assemblies or can be used in combination.

Means for attaching the brake pedal to the weight include a magnet, an elastomer band, a swing hook assembly mounted at the top of the weight, a spring, a rope or the like.

Means for constraining the motion of the base include a magnet, a hooking mechanism for hooking into the carpet on the floor, a pair of rails mounted front-to-back on the bottom of the weight, a fastening mechanism such as a snap, velcro strips and hooks, loops and knobs, buttons and button holes using heavy cloth secured to the mount, a bungee cord secured between loops or hooks on the base and a securable point on the towed vehicle, clamps secured to the towed vehicle or the like. The forgoing can be used singly or in combination wherein the combination employs the same or different means.

Means for moderating the motion of the weight can include lubrication of the slidable mount between the weight and the base wherein the lubrication material can be graphite, a light or stiff grease, light or viscous oil or the like. In addition, means for moderating the motion of the weight can include a spring, mounted between the weight and the towed vehicle or between the weight and the base, a bungee cord or other elastomer cord, mounted between the weight and the towed vehicle or between the weight and the base, a shock absorber or the like. The forgoing can be used singly or in combination wherein the combination employs the same or different means.

The base can be constructed of wood, metal ceramic, fiberglass composite, a combination of the forgoing or other suitable material.

The weight can be a solid object or can comprise a plurality of separable weight segments and can be constructed of various types of steel, iron, lead or other metal, ceramic, a metal polymer composite, a combination of any of the forgoing or other suitable material and should have sufficient mass to apply a braking force to the brake pedal of the towed vehicle during operation. In addition, various fixtures can be attached to the weight including a handle, a means for attaching the brake pedal to the weight, loops, hooks, hinges or the like for attaching certain means for moderating the motion of the weight and for securing the actuator during storage, or a combination of any of the forgoing. Inasmuch as such fixtures, alone or in combination, can contribute to the mass of the weight, such mass can be considered to be a part of the weight for the purpose of actuating the brake pedal. Weights can range from about 25 to about 75 lb., with about 40 lb. being typical.

Springs, bungee cords or other elastomer materials used in this invention can have various Hook's law force constants in that the restoring force exerted is proportional to the distance of stretch. Typical linear force constants used in this invention are from about 0.5 to about 12 lb/in. In addition, spring devices can exhibit nonlinear behavior. For example, certain elastomers are distensible so that the restoring force changes with time for a given length of stretch. As another example, the restoring force can follow a quadratic or power law with the length of stretch. As another example, when a shock absorber and a spring, bungee cord or other elastomer are used in combination, the length of stretch will be responsive to a gradually applied force, such as when the combination is traversing a hill or when the brakes of the towing vehicle are applied gradually and less responsive to rapidly changing forces, such as when the combination encounters a pothole, a speed bump or other bump in the road. The sensitivity of such a combination can be optimized for various road conditions by selection of the proper components or adjusting the tension of the spring, bungee cord or elastomer material.

The auxiliary vacuum source can be an evacuated ballast tank, a connection to the vacuum system of the towing vehicle, an electrically operated vacuum pump such as that disclosed by Otto in U.S. Pat. No. 5,707,222, incorporated herein by reference or a vacuum pump such as might be available for use with electric or hybrid automobiles. The vacuum pump may include an integrated normally-on vacuum switch which eliminates the need for a separate vacuum switch. A commercially available vacuum pump suitable for use with the present invention is the CEV vacuum pump kit, available from Canadian Electric Vehicles Ltd., Errington, BC V0R 1V0 Canada or the Thomas Vacuum pump, available from InnEVations of Santa Rosa, Calif. 95407. The former pump includes an integrated vacuum switch while the latter pump requires the use of a separate vacuum switch. The vacuum pump can be operated electrically or can be powered by the wheels while the towed vehicle is in motion. The auxiliary electric vacuum system typically has a manual on-off switch, a normally-on vacuum actuated switch, a vacuum pump, tubing and a check valve installed on the existing vacuum-assisted brake booster.

While the apparatus shown herein and disclosed in detail is fully capable of attaining the objects and advantages of this invention, it is to be understood that it is merely illustrative of the invention and that no limitations are intended to the details of construction or design other than as defined in the appended claims or their equivalents.

I claim:

1. An inertial brake actuator for a towed vehicle having a floor and a braking system actuated by a brake pedal comprising:
   a. a base comprising a top side and a bottom side, wherein said base is suitable for mounting in the vehicle;
   b. a weight comprising a means for contacting the brake pedal, a top and a bottom, slidably mounted to the base along a line of travel between a forward position and a rearward position, wherein the means for contacting the brake pedal are configured to actuate the brake pedal responsive to the deceleration of the towed vehicle and wherein the weight has sufficient mass to apply a braking force to the brake pedal during deceleration of the towed vehicle;
   c. sliding means between the base and the weight wherein the sliding means enforce said line of travel between said forward position and said rearward position.

2. The inertial brake actuator of claim 1 further comprising means for attaching the brake pedal to the weight.

3. The inertial brake actuator of claim 1 wherein the sliding means are configured between the base top side and the weight bottom.

4. The inertial brake actuator of claim 1 wherein the weight comprises a plurality of separable weight segments.

5. The inertial brake actuator of claim 1 wherein said base further comprises means for constraining motion of the base relative to the motion of said towed vehicle while said towed vehicle is being towed.

6. The inertial brake actuator of claim 1 further comprising means for moderating the motion of the weight along said line of travel.

7. The inertial brake actuator of claim 6 wherein said weight has sufficient mass to apply a braking force capable of slowing said towed vehicle by at least 10 percent.

8. The inertial brake actuator of claim 6 wherein said weight has sufficient mass to apply a braking force capable of slowing said towed vehicle by at least 50 percent.

9. An inertial brake actuator for a towed vehicle having a floor and a vacuum-based power assisted braking system actuated by a brake pedal comprising:
   a. a base comprising a top side and a bottom side, wherein said base is suitable for mounting in the vehicle;
   b. a weight comprising a means for contacting the brake pedal, a top and a bottom, slidably mounted to the base along a line of travel between a forward position and a rearward position, wherein the means for contacting the brake pedal are configured to actuate the brake pedal responsive to the deceleration of the towed vehicle and wherein the weight has sufficient mass to apply a braking force to the brake pedal during deceleration of the towed vehicle;
   c. sliding means between the base and the weight wherein the sliding means enforce said line of travel between said forward position and said rearward position;
   d. an auxiliary vacuum source connectable to the towed vehicle braking system to augment the actuation of the towed vehicle braking system.

10. The inertial brake actuator of claim 9 further comprising means for attaching the brake pedal to the weight.

11. The inertial brake actuator of claim 9 wherein the sliding means are configured between the base top side and the weight bottom.

12. The inertial brake actuator of claim 9 wherein the weight comprises a plurality of separable weight segments.

13. The inertial brake actuator of claim 9 wherein said base further comprises means for constraining motion of the base relative to the motion of said towed vehicle while said towed vehicle is being towed.

14. The inertial brake actuator of claim 9 further comprising means for moderating the motion of the weight along said line of travel.

15. The inertial brake actuator of claim 14 wherein said weight has sufficient mass to apply a braking force capable of slowing said towed vehicle by at least 10 percent.

16. The inertial brake actuator of claim 14 wherein said weight has sufficient mass to apply a braking force capable of slowing said towed vehicle by at least 50 percent.

17. The inertial brake actuator of claim 9 further comprising means for moderating the motion of the weight along said line of travel, and wherein said base further comprises means for constraining motion of the base relative to the motion of said towed vehicle while said towed vehicle is being towed.

18. The inertial brake actuator of claim 9 wherein the auxiliary vacuum source comprises a vacuum pump.

19. The inertial brake actuator of claim 17 wherein said vacuum pump is operated electrically.

20. The inertial brake actuator of claim 19 wherein said vacuum pump is connected to a vacuum switch.

* * * * *